United States Patent Office 3,238,599
Patented Mar. 8, 1966

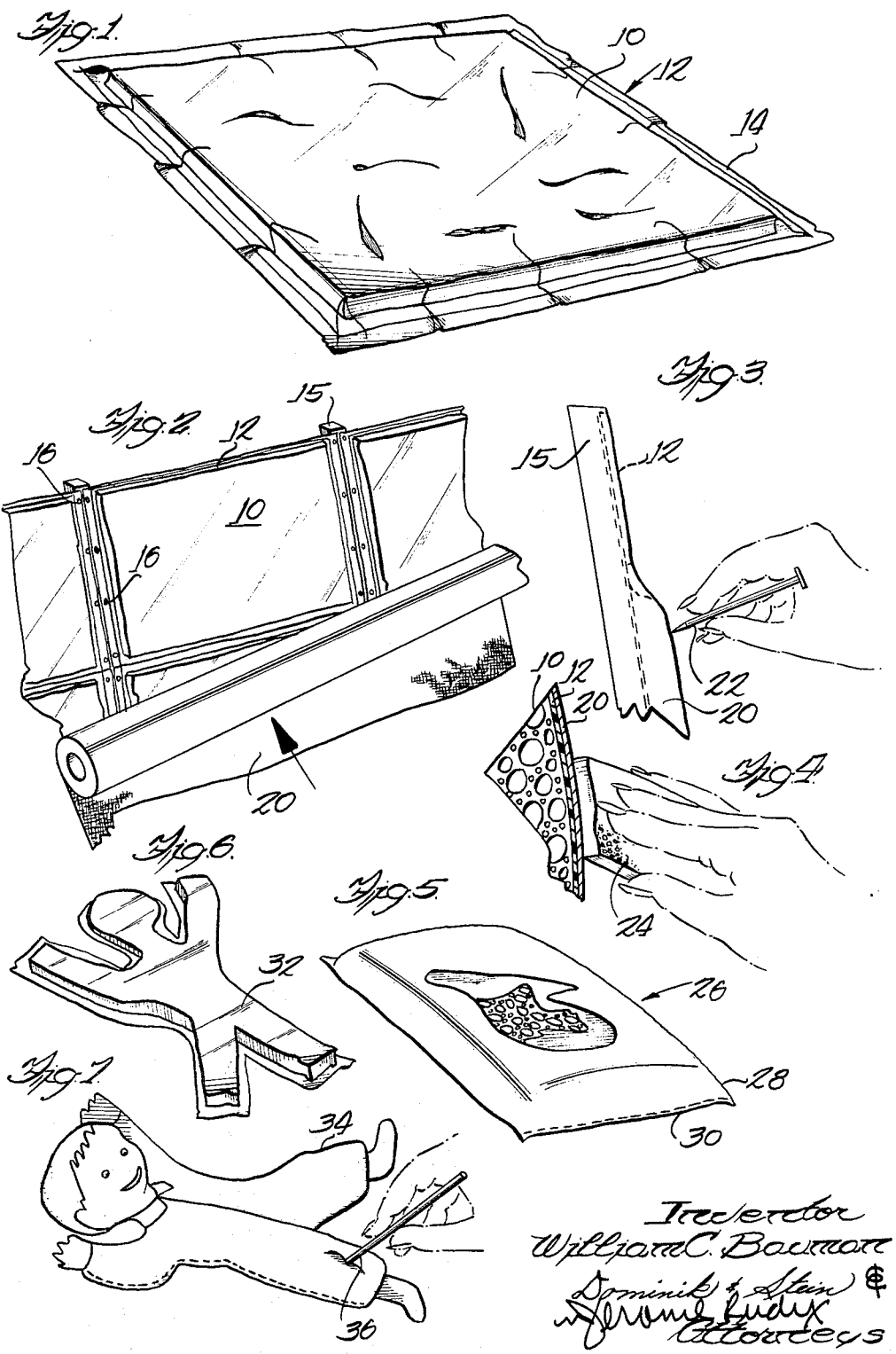

3,238,599
PADDING METHOD
William C. Bauman, Midland, Mich., assignor to The Dow Chemical Company, Midland, Mich., a corporation of Delaware
Filed Feb. 27, 1964, Ser. No. 347,909
6 Claims. (Cl. 29—91.1)

This invention relates to a method of padding upholstery, pillows, cushions, stuffed toys, crash pads, mattresses and the like. The method utilizes a unique package of compressed plastic foam whereby manufacture of the stuffed item is simplified. This application is a continuation-in-part of application Serial No. 56,364 filed September 16, 1960, now abandoned.

As disclosed in the parent application, a package of compressed synthetic plastic foam is made by compressing a body of foam to a fraction of its normal volume. Then the foam is sealed in a substantially vapor impermeable plastic bag. In the preferred arrangement, the foam is first placed into the bag and then the bag is compressed. Air is then expelled from the bag by application of a vacuum prior to sealing the bag, unless the compression acts to substantially expel all the air. The bag is then preferably heat sealed so that the atmospheric pressure outside of the bag will thereafter maintain the foam in a compressed condition. Only when the bag is pricked will the foam re-expand to its normal volume. And by re-expanding the foam only after it has been placed in a useful position, such as in upholstery, pillows, etc., unique beneficial results will be obtained. The expanded foam will then snugly engage the outer casing to provide a "full" appearance. In addition, the bag itself will thereafter serve a useful purpose, specifically, as a protective layer for the expanded foam.

An object of this invention is to provide a unique method for the manufacture of stuffed items such as upholstery.

Another object is to simplify the stuffing of such items by the use of a uniquely packaged plastic foam.

A further object is to provide stuffing for such items wherein soiling of the interior is substantially eliminated.

Another object is to provide a stuffed item wherein the outer decorative layer which may comprise fabric and the like may be cleaned without adversely effecting the padding within the item.

Another object is to provide plastic foam for use in padding of stuffed items wherein its physical shape facilitates the manufacture of such stuffed items.

Another object is to provide padding for stuffed items which can be utilized in the manner whereby unique decorative effects can be imparted to said item and to the outer fabric thereof.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

Broadly, the invention comprises utilization of the uniquely packaged plastic foam of the parent application, Serial No. 56,364 filed September 16, 1960, now abandoned, in a manner wherein the stuffed item to be manufactured is assembled while the plastic foam utilized for padding is in a compressed state. After the item has been completed, the packaged plastic foam is punctured with a needle or similar sharp tool to permit the foam to expand into its natural condition. Such expansion after the stuffed item has been completely assembled provides a unique "full" effect and simplifies the task of assembly in that the operator does not have to work against the force of padding within said item. As illustrated in FIG. 2 of the attached drawing, bags 12 of compressed foam 10 are applied to the frame of the upholstered item being manufactured. The fabric 20 is then nailed or otherwise affixed to the frame and afterwards, the individual bags 12 are punctured by a sharp tool 22 (see FIG. 3) to permit self-expansion of the foam while in the now punctured bags. If desired, a gas of beneficial effect could be inserted into the bag by the use of a hypodermic needle.

During use, the bag casing acts as a water impervious layer for the filler or plastic foam so that washing, such as illustrated in FIG. 4, of the fabric itself may be accomplished without deleteriously effecting the padding.

For a fuller understanding of the nature and objects of the invention, reference should be had to the following detailed description taken in connection with the accompanying drawing in which:

FIG. 1 is a perspective top view of the plastic foam packaged in a compressed state within a bag.

FIG. 2 is a partial perspective view of the use of said bag in manufacturing upholstered furniture in accordance with the method of this invention.

FIG. 3 illustrates puncturing of the bag in which the compressed foam is packaged to cause the upholstered item of FIG. 2 to assume its final stuffed appearance.

FIG. 4 illustrates the washing of the upholstered furniture of FIG. 2.

FIG. 5 illustrates the use of the bag packaged compressed foam in a pillow.

FIG. 6 illustrates the use of a bag packaged compressed foam, of particular design, for making a stuffed doll.

FIG. 7 illustrates the final puncturing step in the formation of the doll.

Similar reference characters refer to similar parts throughout the several views of the drawing.

As seen in FIG. 1, the bag package compressed foam comprises a slab of foam 10, in compressed condition, within sealed plastic bag 12. A subatmospheric pressure condition exists within the bag so that the atmospheric pressure outside of the bag retains the foam in a compressed condition. There is substantially no moisture content within the bag for this would be deleterious to the use of the bag in the articles described hereinafter.

In FIGS. 2 and 3, there is shown the unique method for using the bag of compressed foam of FIG. 1. The bag, with its wide edge heat seal 14 is fastened to the wood or metal frame 15 of the upholstered item via nails or staples 16. The nails or staples are driven into the sealed edge portions of the bag so as not to puncture the bag. Subsequently, fabric, leather, plastic or any other material useful as upholstery covering is then nailed or otherwise secured to the frame over the bag packaged compressed foam.

Afterwards, and if desired, even after shipment to the point of sale, each individual bag 10 is then punctured with a nail 22 or other sharp object. Such puncturing permits entry of air into the sealed bag and the compressed foam, of its own volition, re-expands into its natural shape. This provides body to the upholstered item. Of course, by appropriate positioning of the bag, or a number of bags, or by utilizing bags of differing shapes and dimensions, unique designs can be imparted to the upholstered item.

Subsequently, during use of the upholstered item, if the fabric 20 becomes soiled, it is easy to wash or clean. As illustrated in FIG. 4, a sponge 24, or brush, etc., wet with cleaning solution, may be utilized. The solution does not penetrate into the foam 10 because it is protected by the vapor impermeable bag 12 which remains in place even though punctured. Thus, undesirable saturation of the padding or filler with resultant sagging, balling and the like is avoided. It might also be noted that the bag 12 will act as a protective layer in the event of accidental spillage or soilage of the upholstered item. Such spilled liquid does not penetrate the filler and merely remains on the upholstery covering.

FIG. 5 illustrates the making of a pillow utilizing the bag packaged compressed foam of FIG. 1. As illustrated, the pillow 26 may be made by sewing the bag packaged compressed foam within a cloth covering 28. The seams 30 may be made directly on the outside of the bag and there would be no need to reverse the cloth covering in sewing the last seam after insertion of the padding therein. Subsequently, the interior padding is protected by reason of the plastic bag which encases the foam.

By providing various thicknesses of foam within the bag, one can effect a very "full" body in the pillow.

FIGS. 6 and 7 illustrate the making of a stuffed doll in accordance with the method of this invention. As illustrated in FIG. 6, the bag packaged compressed foam is made in the shape of a doll to be manufactured. The skeleton form 32 is used as a base upon which fabric 34 is sewn. Then the plastic bag is punctured by needle 36 to cause self-expansion and imparting of a body to the doll. It should be evident that such manufacture of a doll simplifies the technique and imparts a unique economy to such manufacture.

In certain instances, it may be desirable to puncture the bag with a hypodermic needle (not shown) whereby an insulative gas or other useful gas may be imparted into the bag.

It should also be evident that the technique here employed may be useful for the manufacture of other stuffed items such as life preservers, mattresses, pads, cushions and the like.

It will thus be seen that the objects set forth above, among those made apparent from the preceding description, are efficiently attained, and since certain changes may be made in carrying out the above method and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

What is claimed is:

1. A method for manufacturing stuffed items such as upholstery and the like comprising the steps of enclosing within a casing to be used for said stuffed item an evacuated sealed vapor impermeable plastic bag containing synthetic plastic foam in a compressed state by reason of atmospheric pressure on said bag and subsequently puncturing said bag to cause re-expansion of said foam, of its own volition, whereby body is imparted to said stuffed item.

2. A method for manufacturing an upholstered item with a support frame comprising the steps of fastening evacuated sealed vapor impermeable plastic bags containing synthetic plastic foam to said support frame, then covering said frame with said bags secured thereto with upholstery covering and subsequently puncturing said bags to cause re-expansion of said foam, of its own volition, whereby body is imparted to said upholstered item.

3. The method of claim 2 wherein said bags are positioned on said frame to impart a desired ornamental shape to said upholstered item when said bags are punctured.

4. A stuffed item such as an upholstered item, a stuffed doll, a pillow and the like comprising at least one substantially evacuated sealed vapor impermeable bag containing expandable synthetic plastic foam which is compressed to a fraction of its normal volume, the atmospheric pressure outside of said bag maintaining said foam in said compressed condition until said bag is punctured, whereby said stuffed items can be formed by sealing said bag within its covering and thereafter puncturing said bag to permit said foam to expand to shape said stuffed item.

5. An upholstered item comprising a support frame, a plurality of substantially evacuated sealed vapor impermeable bags each containing expandable synthetic plastic foam which is compressed to a fraction of its normal volume, the atmospheric pressure outside of said bag maintaining said foam in said compressed condition until said bag is punctured, said foam when expanded constituting the filler for said upholstered item, and an upholstery covering over said bags and fastened to said frame, whereby upholstered items can be formed by fastening said bags to said support frame and thereafter punctured to permit said foam to expand to provide the filler for said upholstered item.

6. The method of making upholstered furniture comprising the steps of compressing plastic foam material in a bag of a vapor impermeable material, applying a vacuum and heat sealing the edges of said bag to maintain the plastic foam material compressed by atmospheric pressure, and fastening the edges of said sealed bags of compressed foam material to a furniture frame, then covering said frame with the bags secured thereto with upholstery covering and subsequently puncturing each of said bags to permit re-expansion of each of said foams, of their own volition, whereby body is imparted to the upholstered furniture.

References Cited by the Examiner
UNITED STATES PATENTS

| | | | |
|---|---|---|---|
| 2,613,862 | 10/1952 | Vaughn | 53—21 X |
| 2,764,859 | 10/1956 | Hanselmann | 53—22 |
| 2,785,739 | 3/1957 | McGregor et al. | 5—361 |
| 2,913,041 | 11/1959 | Mathison | 29—91.1 |

WHITMORE A. WILTZ, *Primary Examiner.*

THOMAS H. EAGER, *Examiner.*